No. 765,788. Patented July 26, 1904.

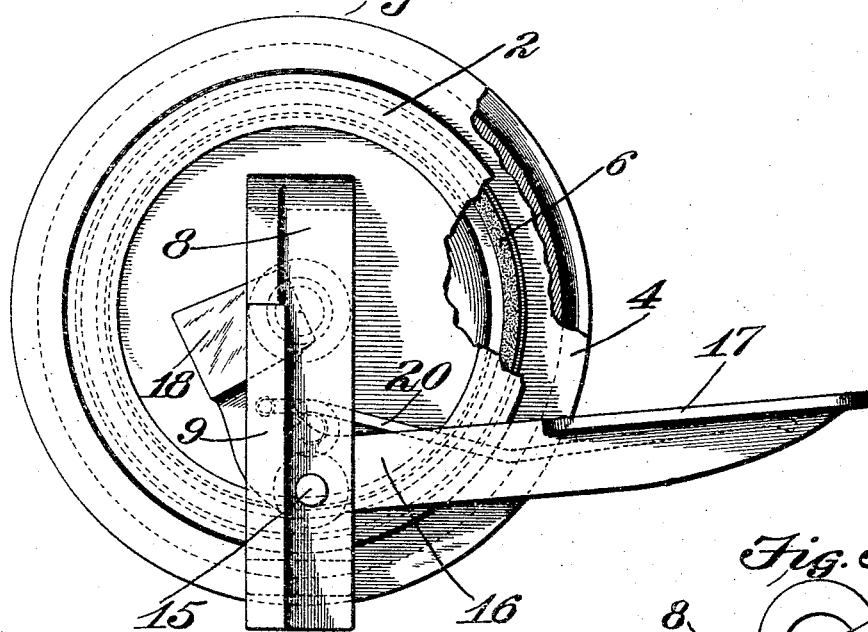
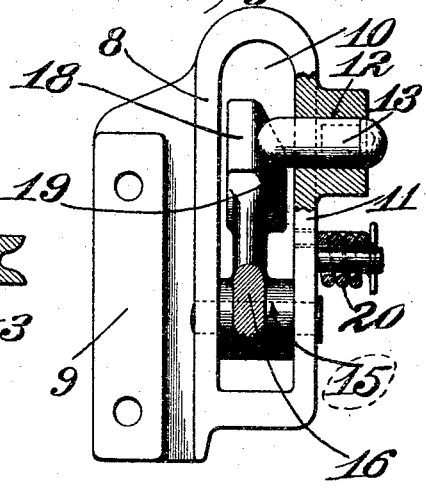
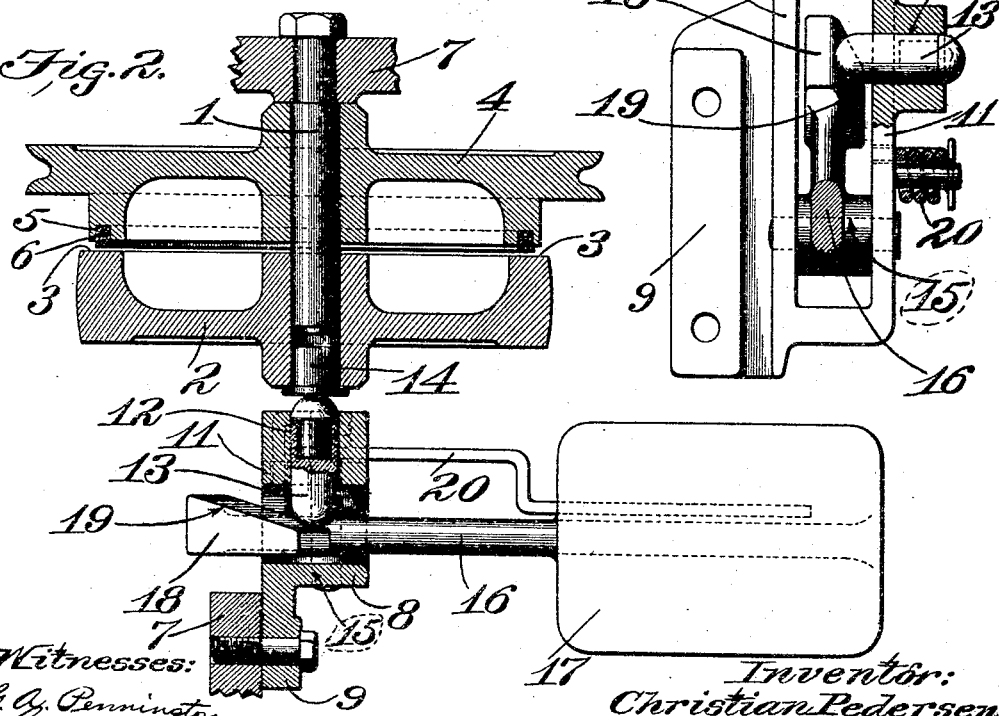

UNITED STATES PATENT OFFICE.

CHRISTIAN PEDERSEN, OF ST. LOUIS, MISSOURI, ASSIGNOR TO LANDIS MACHINE COMPANY, OF ST. LOUIS, MISSOURI, A CORPORATION OF MISSOURI.

CLUTCH.

SPECIFICATION forming part of Letters Patent No. 765,788, dated July 26, 1904.

Application filed September 14, 1903. Serial No. 173,138. (No model.)

*To all whom it may concern:*

Be it known that I, CHRISTIAN PEDERSEN, a citizen of the United States, residing at St. Louis, Missouri, have invented a certain new and useful Improvement in Clutches, of which the following is a full, clear, and exact description, such as will enable others skilled in the art to which it appertains to make and use the same, reference being had to the accompanying drawings, forming part of this specification, in which—

Figure 1 is a side elevation, partly in section. Fig. 2 is a plan view, chiefly in section; and Fig. 3 is a detail front elevation, partly in section.

This invention relates to improvements in clutches, the object being to provide a powerful clutch of simple construction and convenient operation.

To these ends and also to improve generally upon devices of the character indicated the invention consists in the various matters hereinafter described and claimed.

Referring now more particularly to the drawings, 1 indicates a shaft which is supported in any suitable manner. Loosely mounted upon said shaft to rotate thereon is a disk or clutch member 2, having a clutch-face 3 upon one side. Also loosely mounted upon said shaft is a second disk or clutch member 4, in whose face adjacent said clutch-face 3 of said first-mentioned clutch member is an annular groove or recess 5, in which is received a leather or other packing 6, which projects slightly beyond what may be termed the "inner" face of said second clutch member. When said clutch members are forced into engagement with each other, the face 3 of the clutch member 2 engages said projecting packing 6, and the clutch members are thus so engaged with each other that they are compelled to rotate together. The disk 4 upon its side opposite that upon which the clutch member 2 is located is adapted to bear against some suitable abutment (such as the machine-frame 7, in which the shaft 1 is mounted) in order to prevent movement of said disk 4 away from said disk 2.

At what may be termed the "outer" side of the disk 2 is a frame 8, which has a plate 9, adapted to be secured to the frame of the machine or any other suitable support, said frame 8 having a slot 10. Through the wall 11 of the frame intermediate said slot and what may be termed the "outer" face of the disk 2 is an opening or seat 12, through which a pin 13 is movable, said pin bearing against the outer face of the disk 2 (or a plug 14, driven in the axial opening through said disk) at the center of rotation of the same. This pin is preferably rounded at both ends.

Mounted upon the pivot-pin 15, which extends across the before-mentioned slot 10, is a bell-crank lever 16, which can be conveniently provided with a treadle 17 upon its substantially horizontal arm. The substantially vertical arm of the lever is enlarged and formed into a head 18, which has a cam or inclined face 19 adjacent the end of the said pin 13. A spring 20, suitably secured to the frame 8, bears at one end against the under side of the treadle, and thus serves to hold the lever 16 in what may be termed "inoperative" position.

Connection is made between the disk 2 and the source of power and between the disk 4 and the mechanism to be driven, so that the disk 2 constantly operates. When the lever 16 is in inoperative position, its head 18 is clear of the pin 13 and the disk 2 is free to move away from the disk 4. When, however, the treadle 17 is depressed, the cam-head 18 of the lever engages the pin 13, forces the same against the disk 2, (or the plug 14, which is practically a part of said disk,) and thus forces said disk 2 into clutching engagement with the disk 4, whereupon the disk 4 is rotated.

For convenience of construction the axial opening 21 is bored entirely through the hub of the disk 2, and the plug 14 is then driven into what may be termed the "outer" end of said opening in order to form a bearing for the pin 13.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

In a clutch, coöperating clutch members, a frame having means for attaching the same to a support and having a slot formed therein, a lever pivoted to said frame and operating in said slot, and a pin supported in the wall of said frame adjacent one of said clutch members and adapted to engage said clutch member, said pin being in the path of movement of said lever; substantially as described.

In testimony whereof I hereunto affix my signature, in the presence of two witnesses, this 31st day of August, 1903.

CHRISTIAN PEDERSEN.

Witnesses:
   GALES P. MOORE,
   GEORGE BAKEWELL.